United States Patent
Anand et al.

(10) Patent No.: US 12,179,617 B2
(45) Date of Patent: Dec. 31, 2024

(54) QUICK TURN OFF OF CONTACTOR SYSTEM DURING POWER OFF

(71) Applicant: TEXAS INSTRUMENTS INCORPORATED, Dallas, TX (US)

(72) Inventors: Priyank Anand, Bangalore (IN); Ashish Ojha, Bangalore (IN); Krishnamurthy Shankar, Bangalore (IN); Venkatesh Guduri, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 406 days.

(21) Appl. No.: 17/826,822

(22) Filed: May 27, 2022

(65) Prior Publication Data

US 2023/0382246 A1    Nov. 30, 2023

(51) Int. Cl.
  *B60L 53/16* (2019.01)
  *B60L 53/62* (2019.01)
(52) U.S. Cl.
  CPC ............... *B60L 53/16* (2019.02); *B60L 53/62* (2019.02)
(58) Field of Classification Search
  CPC ................................ B60L 53/16; B60L 53/62
  USPC ........................................................... 439/34
  See application file for complete search history.

(56) References Cited

U.S. PATENT DOCUMENTS

| | | | | |
|---|---|---|---|---|
| 6,043,702 A * | 3/2000 | Singh | ............... | H03K 19/00315 327/309 |
| 6,097,237 A * | 8/2000 | Singh | ............... | H03K 19/00315 326/27 |
| 6,326,805 B1 * | 12/2001 | Whitworth | .......... | H04L 25/0298 327/321 |
| 6,329,837 B1 * | 12/2001 | Whitworth | .......... | H04L 25/0278 327/321 |
| 6,331,786 B1 * | 12/2001 | Whitworth | .......... | H04L 25/0298 327/321 |
| 2021/0351178 A1 * | 11/2021 | Wood | .................. | H01L 21/3083 |

* cited by examiner

*Primary Examiner* — Gary F Paumen
(74) *Attorney, Agent, or Firm* — Valerie M. Davis; Frank D. Cimino (57) ABSTRACT

Examples of contactor controllers, systems and methods enable quick-turn-off (QTO) using an output voltage of a contactor controller when its supply voltage is below a threshold but does not interfere with QTO when sufficient supply voltage is available. In an example, when VM loss occurs, a high-side (HS) clamp of a contactor controller is disabled, and a low-side (LS) clamp current is generated using the output voltage. The LS clamp current may be adjusted to achieve a desired QTO voltage. In another example, a HS clamp is disabled and the charging of the gate of a LS field-effect transistor (FET) is enabled only when the output voltage increases above a power-off QTO threshold (less than the LS clamp voltage); the QTO voltage is set by a voltage detection and comparison circuit of the contactor controller.

20 Claims, 8 Drawing Sheets

QUICK TURN OFF OF CONTACTOR SYSTEM DURING POWER OFF

FIELD OF DISCLOSURE

This disclosure relates to executing quick-turn-off (QTO) of a contactor system during power-off, and more particularly to structures and methods to generate reverse polarity across the coil of a contactor system to actuate its armature and thus execute QTO during power-off while not limiting powered-on QTO.

BACKGROUND

High-voltage contactor systems are widely used in electric vehicles (EVs) and hybrid electric vehicles (HEVs) to control voltage supply to various components. There are different types of contactor systems for different functions in a vehicle but they are similar in some respects.

Generally, a high-voltage contactor system is an electromechanical switching device controller with an associated contactor including a coil to generate a magnetic force to mechanically operate an electric contact (or armature). An appropriate amount of current is applied to the coil to ensure proper force to actuate the contact for robust operation. As an important safety feature in EVs and HEVs, a high-voltage contactor system should be resistant to high voltage load, shock, strong arc extinguishing, and breaking capacity. Such contactor system should also be able to smoothly and safely execute quick-turn-off (QTO), e.g., execute a high rate of current decay or discharge. QTO is needed because slow rate current decay may cause chattering of the contactor system (or elements thereof), which, in turn, may cause sparks and/or electrical discharges. Without QTO, the contactor may rupture or burn.

Fast decay of current in the coil (load) requires that a high, reverse polarity voltage, greater than the supply voltage, be generated across the coil (load). When power is present, conventional high-side (HS) and low-side (LS) clamps are configured to implement a clamp voltage for QTO using the supply voltage to create the reverse polarity to enable a path for the load current to quickly discharge. The higher the clamp voltage, the faster the current decay. The clamp voltage, however, may not exceed a maximum clamp voltage, which is determined based on the breakdown characteristics of the transistors in contactor system. Under normal operating conditions (i.e., when power in on), the supply voltage is used in connection with circuitry in the contactor system to generate a clamp current and to modulate and control the clamp voltage.

Conventional clamps, however, are not well suited for QTO when the power goes off. Without a sufficient supply voltage, the clamp current remains very low (at or near zero) and high reverse polarity voltage across the coil needed for fast current decay is not achieved. This results in slower current decay, which may cause system damage.

Safe and reliable QTO execution is needed even when the system power is off, i.e., a sudden loss of power. A solution to this issue is thus desirable.

SUMMARY

In an example, a method comprises detecting that a supply voltage (e.g., VM) of a contactor system is less than a threshold voltage in response to a determination that quick-turn-off (QTO) is to be performed; disabling a high-side (HS) clamp of the contactor system; generating a current for a low-side (LS) clamp of the contactor system using an output voltage (e.g., $V_{OUT}$) of the contactor system; and performing QTO.

In an example, a method comprises detecting that a supply voltage of a contactor system is less than a threshold voltage in response to a determination that QTO is to be performed; disabling a HS clamp of the contactor system; setting a QTO threshold voltage; determining that an output voltage of the contactor system is greater than the QTO threshold voltage; enabling charging of a LS transistor of the contactor system; and performing QTO.

In an example, a system comprises a HS transistor having first and second current terminals and a gate; a LS transistor having first and second current terminals and a gate; and a middle transistor having first and second current terminals and a gate, the second current terminal of the middle transistor coupled to the second current terminal of the HS transistor, and the first current terminal of the middle transistor coupled to the first current terminal of the LS transistor, the coupling of the first current terminals of the middle and LS transistors providing an output node of the system. A HS clamp is coupled between the gate of the middle transistor and the output node. The HS clamp includes a disable circuit having a supply voltage input, an output voltage input, and an output coupled to a switch-controlled current path between the first terminal of the middle transistor and the gate of the middle transistor. A LS clamp is coupled between the gate of the LS transistor and the output node. The system further comprises a control circuit having a supply voltage input, an output voltage input, and an output coupled to the LS clamp.

These and other features will be better understood from the following detailed description with reference to the accompanying drawings.

BRIEF DESCRIPTION OF THE DRAWINGS

Features of the disclosure may be understood from the following figures taken in conjunction with the detailed description.

DETAILED DESCRIPTION

Specific examples are described below in detail with reference to the accompanying figures. These examples are not intended to be limiting. In the drawings, corresponding numerals and symbols generally refer to corresponding parts unless otherwise indicated. The objects depicted in the drawings are not necessarily drawn to scale.

In example arrangements, systems, circuits and methods enable QTO to be performed safely and reliably in the absence of a sufficient supply voltage (VM), e.g., when a sudden loss of power occurs. While enabling QTO without sufficient VM, the arrangements advantageously do not interfere with normal QTO operation when sufficient VM is available, i.e., at or above a minimum voltage level. In an example arrangement, when VM loss occurs, a high-side (HS) clamp of a contactor controller is disabled so it does not start clamping at a very low voltage, and a low-side (LS) clamp current is generated using the output voltage ($V_{OUT}$) of the contactor controller. The LS clamp current may be adjusted to achieve a desired QTO voltage. In another example arrangement, a HS clamp is disabled and the charging of the gate of a LS field-effect transistor (FET) is enabled only when $V_{OUT}$ increases above a power-off QTO threshold (less than the LS clamp voltage); the QTO voltage is set by a voltage detection and comparison circuit of the contactor controller. This latter example arrangement does not depend on fixed and stable current generation; power is taken from $V_{OUT}$ to execute the clamp function by enabling the LSFET when $V_{OUT}$ exceeds the power-off QTO threshold.

Figure 1:
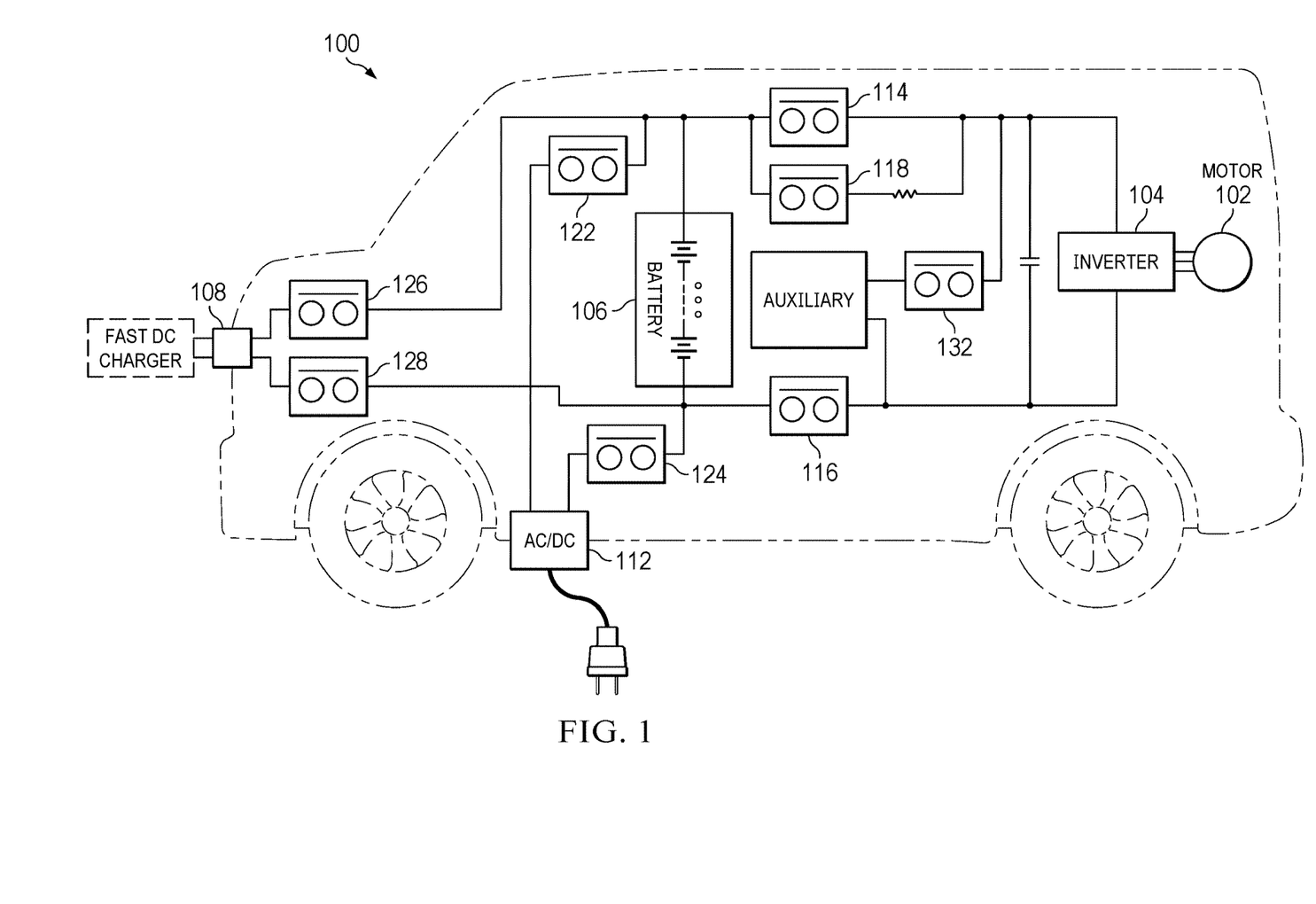
FIG. 1 is a diagram of various types of contactors in an EV and/or HEV environment.

FIG. 1 is a schematic diagram of a vehicle 100, which is an electric vehicle (EV) or hybrid electric vehicle (HEV), showing various types of contactors that may be used in such vehicle. The illustration may be over inclusive in that not all of the contactors shown are necessarily used in either an EV or an HEV. The illustration is intended to give non-exhaustive examples of various contactors.

Vehicle 100 includes a motor 102 and traction inverter 104 coupled to motor 102. Vehicle 100 also includes a battery 106 and a fast DC charge port 108 that is adapted to receive DC charge from an external source. An HEV also includes an AC/DC onboard charger 112.

In the illustrated example, two main contactors 114 and 116 electrically isolate battery 106 and traction inverter 104 when vehicle 100 is switched off for safety. Main contactor 114 is a positive contactor that is disposed between the positive terminal of battery 106 and traction inverter 104. Main contactor 116 is a negative contactor that is disposed between the negative terminal of battery 106 and traction inverter 104. A pre-charge contactor 118 with series-coupled current-limiting resistance is coupled in parallel with main positive contactor 114. Pre-charge contactor 118 is used to charge an initially-discharged DC link capacitor before closing main contactors 114 and 116 to avoid a high inrush-current that may damage battery 106, one or both of main contactors 114 and 116, and/or the DC link capacitor.

When vehicle 100 is an HEV with plug-in charge capability, a pair of additional AC charge contactors 122 and 124 are included to establish connection between battery 106 and AC/DC onboard charger 112, which includes a plug to access an AC electrical source (e.g., an AC electrical outlet), converts that AC electricity to DC electricity to charge battery 106.

When vehicle 100 is an EV, a pair of DC fast charge contactors 126 and 128 to establish connection between fast DC charge port 108 and battery 106. An auxiliary contactor 132 is included for auxiliary components, e.g., the electric heating/cooling system.

Main contactors 114 and 116, pre-charge contactor 118, and DC charge contactors 126 and 128 are usually located in the battery junction box (or battery disconnect unit), while AC charger contactors 122 and 124 are likely to be placed in the battery power distribution unit, which is typically adjacent to AC/DC onboard charger 112.

When the controller for any of the above-identified contactors is turned-off, current in the load is discharged through a current decay path and as a result power is dissipated to effectuate quick-turn-off (QTO). High-side (HS) and low-side (LS) clamps are used in conjunction with drivers and a control circuit to carry out QTO.

Figure 2:
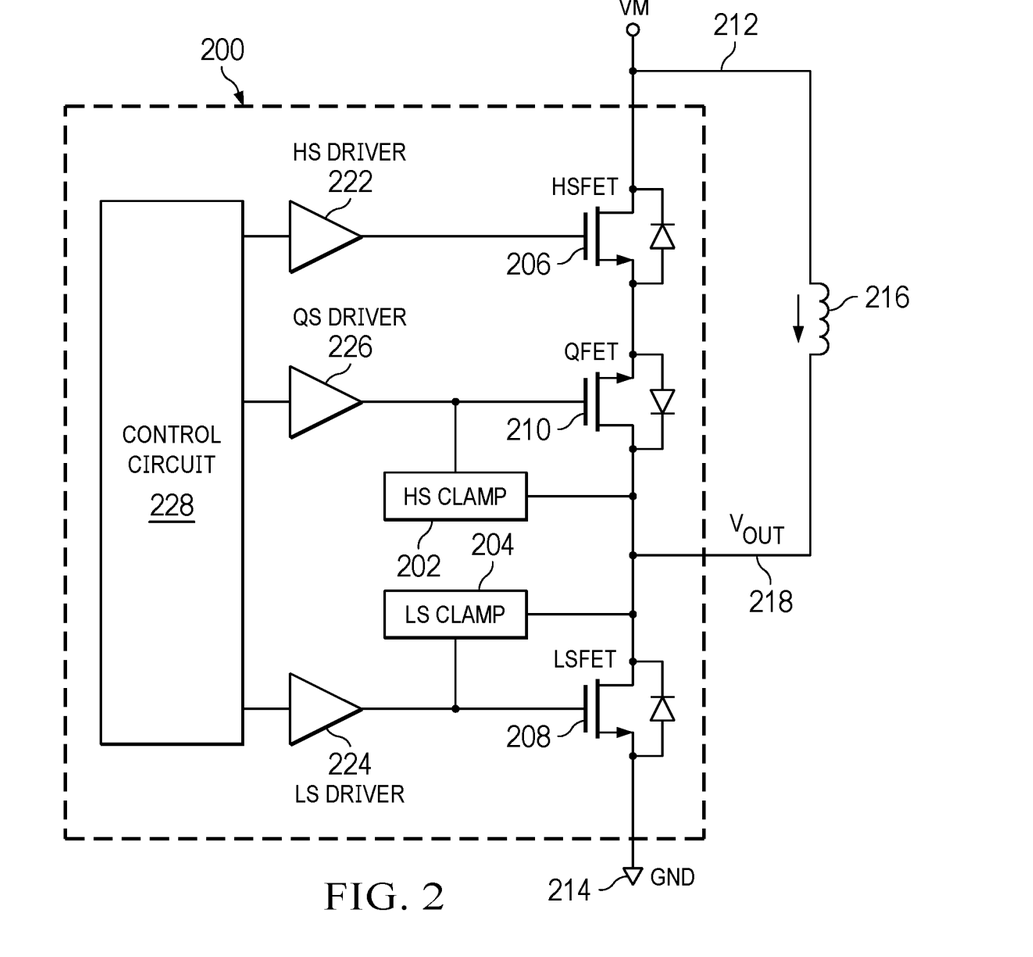
FIG. 2 is a diagram of an example contactor system including a contactor controller and a coil.

FIG. 2 is a circuit and block diagram of an example contactor controller 200, e.g., electromechanical switching device controller, configured with HS clamp 202 and LS clamp 204. Contactor controller 200 may be a high-voltage contactor controller used with contactors in EVs and/or HEVs. Contactor controller 200 includes an HS switch 206, a LS switch 208, and a middle (Q) switch 210, each of which may be implemented as a FET, where the QFET is a quantum FET. In the illustrated example, each of switches 206, 208 and 210 is an n-type metal-oxide-semiconductor field-effect transistor (n-type MOSFET).

The drain of HSFET 206 is coupled to a voltage supply node 212 that includes a terminal adapted to be coupled to a supply voltage (VM). The source of HSFET 206 is coupled to the source of QFET 210, the drain of which is coupled to the drain of LSFET 208. The source of LSFET 208 is coupled to a ground (GND) terminal 214 that is adapted to be coupled to ground. Each of FET 206, 208 and 210 includes a diode having an anode coupled to the source of the corresponding FET and a cathode coupled to the drain of that FET. A coil, e.g., an inductor, 216 (which may represent a load) is coupled between voltage supply node 212 and the common drain connection between LSFET 208 and QFET 210, which common connection forms an output node 218 at which an output voltage ($V_{OUT}$) is output. Contactor controller 200 drives coil 216 to generate a magnetic force to mechanically operate an electric contact or armature (not shown), as is known in the art.

HS clamp 202 is coupled between the gate of QFET 210 and output node 218, and LS clamp 204 is coupled between the gate of LS FET 208 and output node 218. Drivers 222, 224 and 226 are coupled to the gates of FETs 206, 208 and 210, respectively. In the illustrated example, individual drivers, e.g., HS driver 222, LS driver 224 and QS driver 226, are provided. In another example, drivers 222, 224 and 226 may be integrated as a unit. Each of drivers 222, 224 and 226 is also coupled to, and controlled by, a control circuit 228. The arrow in FIG. 2 represents the flow of load current across coil 216, although current may flow in either direction depending on the VM-$V_{OUT}$ difference.

HS clamp 202 may be configured during normal (power-on) operation to enable a path for the load current to charge QFET 210 to increase its gate-to-source voltage ($V_{GS}$), while the $V_{GS}$ of LSFET 208 remains low, causing load current to flow (discharge) through a HS path, i.e., through coil 216 and back up toward VM path, in executing QTO. Alternatively, LS clamp 204 may be configured during normal operation to enable a path for the load current to charge LSFET 208 thus increasing its $V_{GS}$ and, causing the load current to flow through a LS path, i.e., through coil 216 and down toward ground, in executing QTO. The voltages of HS and LS clamps 202 and 204 may be controlled by their respective drivers 222 and 224, which, in turn, are controlled by control circuit 228.

Figure 3:
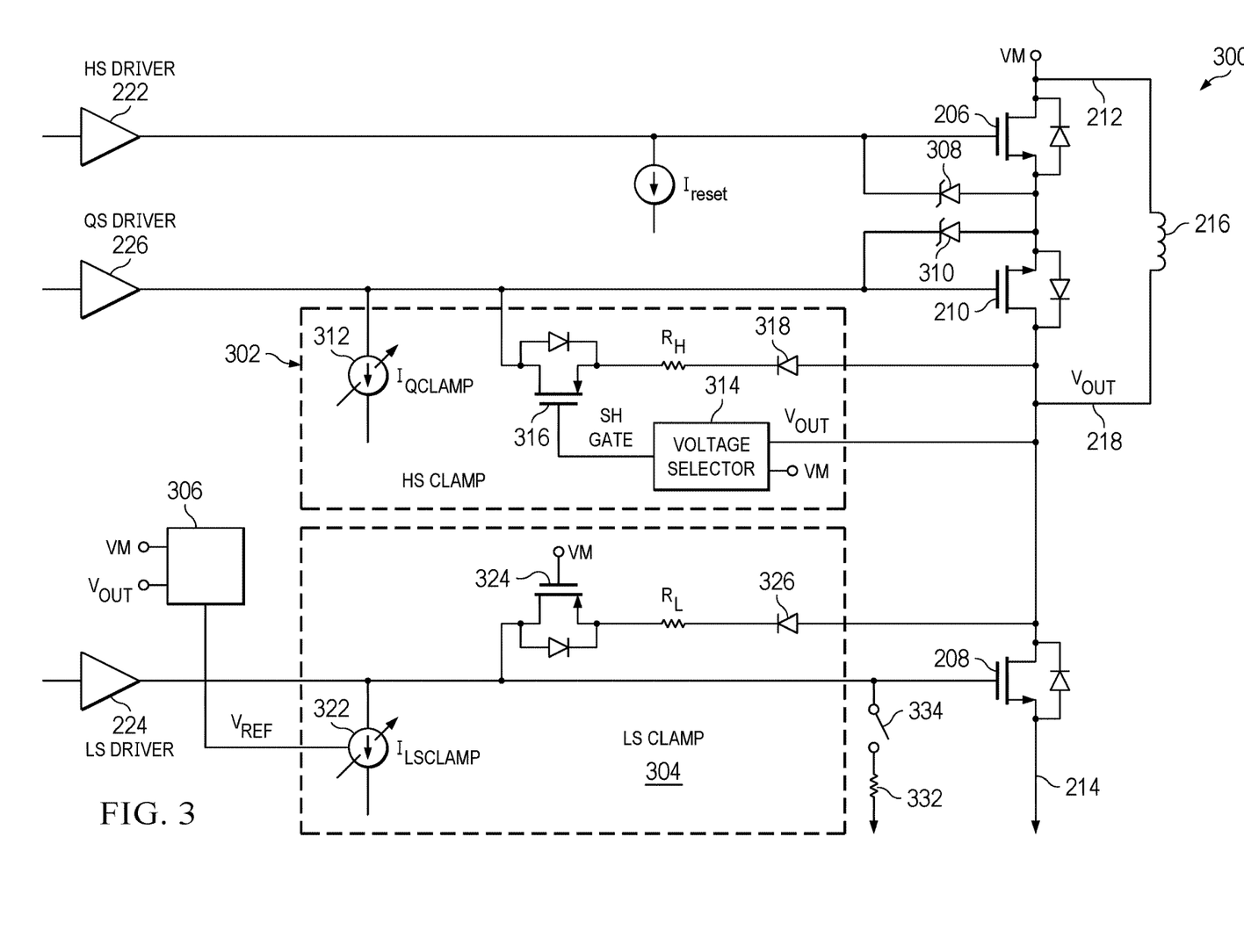
FIG. 3 is a diagram of an example contactor system showing components of example high-side (HS) and low-side (LS) clamps of the contactor controller of the contactor system.

FIG. 3 is a circuit and block diagram of an example contactor controller 300, e.g., electromechanical switching device controller, in which controller 300 is configured to perform QTO during power-off, as well as during power-on. Contactor controller 300 includes an HS clamp 302 and LS clamp 304 configured with circuitry to enable QTO during power off. Contactor controller 300 also includes a clamp current generation circuit 306 having inputs to receive VM and $V_{OUT}$, respectively, and an output coupled to LS clamp 304. The drivers, the FETs, and the coil are configured as described in connection with FIG. 2, and thus the same reference numerals are used for those elements in FIG. 3 as in FIG. 2. The control circuit used to control the drivers is omitted in FIG. 3 simply for clarity. In the configuration of FIG. 3, Zener diodes 308 and 310 are shown. Zener diode 308 is coupled between the source and gate of HSFET 206, and Zener diode 310 is coupled between the source and gate of QFET 210. Such Zener diodes may also be included in the configuration of FIG. 2. Example contactor controller 300 may also include a current source coupled at one end to the signal path extending between HS driver 222 and the gate of HSFET 206. The other end of the current source, which generates a reset current ($I_{reset}$) used to reset contactor controller 300, may be coupled to a common node, e.g., ground.

HS clamp 302 includes a first adjustable clamp current source 312 coupled at one end to the signal path extending between the output of Q driver 226 and the gate of QFET 210. First clamp current source 312 is configured to generate the clamp current for HS clamp 302. The other end of first clamp current source 312 may be coupled to a common node in HS clamp 302. HS clamp 302 also includes a voltage selector 314 having a VM input to receive the supply voltage VM and a $V_{OUT}$ input to receive the output voltage $V_{OUT}$.

Voltage selector 314 has an output at which a signal SH_GATE is output based on either VM or $V_{OUT}$. Voltage selector 314 is configured, as described below in connection with FIG. 4A, to use VM during power-on to generate a control signal SH_GATE and to use $V_{OUT}$ during power-off to generate SH_GATE. The output of voltage selector 314 is coupled to an input of switch 316, which may be implemented in the form of a p-type MOSFET with a diode coupled across its drain and source. In the FET switch implementation, the output of voltage selector 314 is coupled to the gate of FET 316. In an example, the source of FET 316 is coupled to a resistor RH, and a diode 318 is coupled between RH and output node 218. SH_GATE functions as a charge disable signal in that, applying that signal to the gate of FET 318 turns it off during power off, which disables charging of the gate of QFET 210.

LS clamp 304 includes a second adjustable clamp current source 322 coupled at one end to the signal path extending between the output of LS driver 224 and the gate of LSFET 208. Second clamp current source 322 is configured to generate the clamp current for LS clamp 204 in response to, and under the control of, clamp current generation circuit 306, the output of which is coupled to second clamp current source 322. The other end of clamp current source 322 may be coupled to a common node in LS clamp 304. Clamp current generation circuit 306 is configured, as described below in connection with FIG. 4B, to use VM during power-on and to use $V_{OUT}$ during power-off to generate a reference voltage ($V_{REF}$) to control second clamp current source 322 to set and then maintain a constant current $I_{LSCLAMP}$ whether the power is on or off, i.e., whether VM is available or not.

LS clamp 302 also includes a switch 324, which may be in the form of a p-type MOSFET with a diode across its drain and source, and a gate coupled to supply voltage VM. The drain of FET 324 is coupled to the signal path extending between the output of LS driver 224 and the gate of LSFET 210, and the source of FET 324 is coupled to a resistor $R_L$. A diode 326 is coupled between $R_L$ and output node 218.

Contactor controller 300 may also include a pull-down resistor 332, which is selectively couplable via a switch 334 to the signal path extending between the output of LS driver 224 and the gate of LSFET 208. Switch 334 is configured to be actuated (closed) in response to power-off.

Figure 4A:
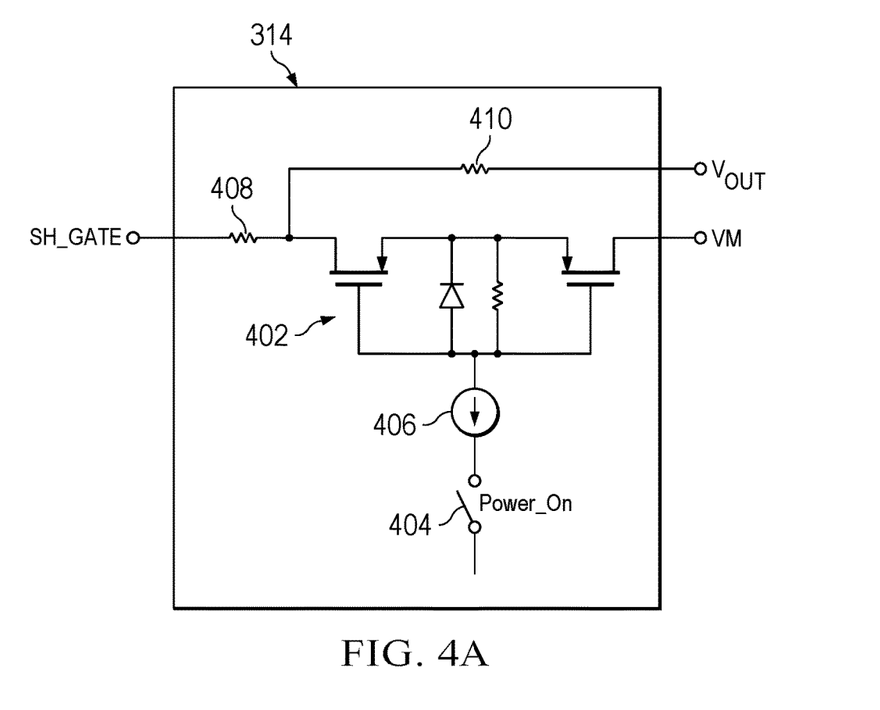
FIG. 4A is a diagram of a voltage selector of a HS clamp, such as that shown in FIG. 3.

FIG. 4A is a circuit diagram of an example voltage selector 314, which is used to disable HS clamp 302 using $V_{OUT}$ when VM is insufficient, e.g., when the power is off, by turning off FET 316 to prevent the charging of the gate of QFET 210. To that end, voltage selector 314 has a $V_{OUT}$ input and an output at which control signal SH_GATE is output. Voltage selector 314 also has an input for VM, which is used to generate SH_GATE when VM is at a sufficient level, e.g., when the power is on. That is, when the power is on, switch 404 is closed to establish a current path for the current of current source 406, which turns on the PMOS transistors of circuitry 402 to create a path from the VM terminal to the SH_GATE terminal through output resistor 408. In the illustrated example, the PMOS transistors are commonly coupled at their sources and also commonly coupled at their gates, which is coupled to current source 406. In the illustrated example, circuitry 402 also includes a diode and a resistor, each coupled between the PMOS transistors' common source node and their common gate node.

Components of circuitry 402 may be configured to require VM to be at or above a threshold minimum level before SH_GATE is output in response to VM. Thus, when the power is on, voltage selector 314 is operable to generate SH_GATE in primarily in response to VM, which is the dominant input voltage. When the power is off, however, switch 404 is open and circuitry 402 is inoperable, in which case $V_{OUT}$ is used to generate SH_GATE, via an input resistor 410 and output resistor 408. The threshold for $V_{OUT}$ to generate SH_GATE may be lower than that for VM. Voltage selector 314 functions to disable the charging of QFET 210 and thus disable HS clamp 302 when the power is off using $V_{OUT}$.

Figure 4B:
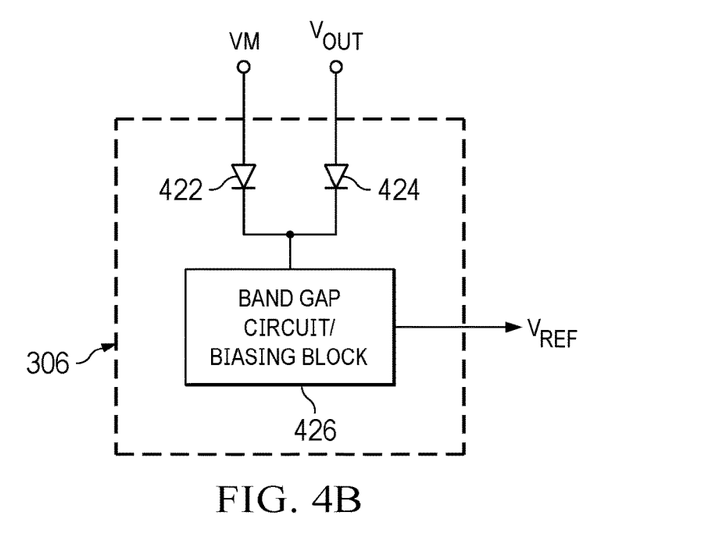
FIG. 4B is a diagram of a constant clamp current generation circuit of a contactor controller, such as that shown in FIG. 3.

FIG. 4B is a diagram of an example clamp current generation circuit 306, which has inputs for VM and $V_{OUT}$. The VM input is coupled to the anode of diode 422, and the $V_{OUT}$ input is coupled to the anode of diode 424. The cathodes of diodes 422 and 424 are commonly coupled to an input of band gap circuit/biasing block 426, an output of which is coupled to second clamp current source 322. Band gap circuit 426 is configured to generate a reference voltage $V_{REF}$ based on either VM or $V_{OUT}$. Diodes 422 and 424 may be selected to have respective forward bias voltages, such that, when VM is at or above a threshold voltage, VM is the dominant input to band gap circuit 426. Moreover, diode 424 may be selected to have a forward bias voltage at a minimum threshold QTO voltage for performing QTO, when VM is not available, i.e., when VM drops below a threshold, which may be the result of the power being off. Thus, when the power is off and $V_{OUT}$ is greater than the minimum threshold QTO voltage, clamp current generation circuit 306 uses $V_{OUT}$ to control second clamp current source 322 and thus to generate the current $I_{LSCLAMP}$, which may then be controlled to set a desired QTO voltage. The QTO voltage=$V_t$+ $(I_{LSCLAMP}*R_L)+V_D+V_{GS}$, where $V_t$ represents the threshold voltage of FET 324, $V_D$ represents the voltage across diode 326, and $V_{GS}$ represents the gate-to-source voltage of FET 324. $I_{LSCLAMP}$ may be adjusted via clamp current source 322 to achieve the desired QTO voltage.

With the configuration shown in FIGS. 3, 4A and 4B, QTO may be performed with or without power. When VM is insufficient, voltage selector 314 acts to disable HS clamp 302 using $V_{OUT}$, and LS clamp 304 is essentially self-powered via clamp current generation circuit 306 also using $V_{OUT}$ to achieve the clamp function, thus enabling QTO during power-off. During power-off, second (i.e., LS) clamp current source 322 is enabled to generate LS clamp current $I_{LSCLAMP}$ by an output signal, generated by clamp current generation circuit 306 in response to \Tam Circuit 306 also sets and maintains $I_{LSCLAMP}$, when activated by the output signal from second clamp current source 322. As an additional precaution, e.g., to avoid LSFET 208 from potentially turning on in response to noise before \Tau reaches a sufficient level and thus putting contactor controller 300 in a slow current decay mode, switch 334 may be closed to activate pull-down resistor 332. In some implementations, pull-down resistor 332 and switch 334 may be omitted to reduce cost and circuit footprint area.

Figure 5:
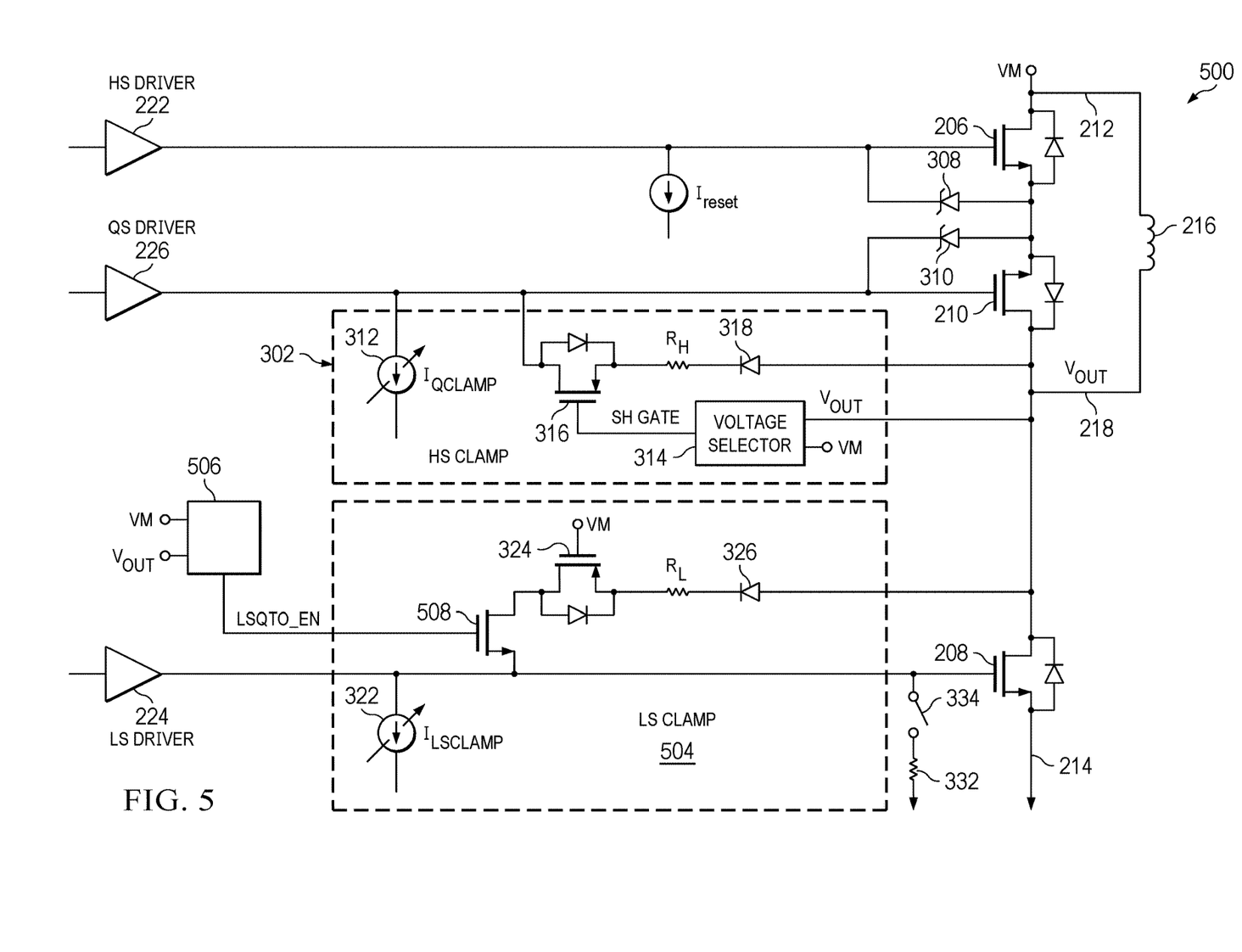
FIG. 5 is a diagram of another example contactor system showing components of example HS and LS clamps of the contactor controller of the contactor system.

FIG. 5 is a circuit and block diagram of another example contactor controller 500, e.g., electromechanical switching device controller, in which controller 500 is configured to perform QTO during power-off, as well as during power-on. Example contactor controller 500 is similar to example contact controller 300 in many respects, and thus common elements are identified by the same reference numerals. Example contactor controller 500 includes voltage selector 314 to disable HS clamp 302 when power is off. Example contactor controller 500 may also include pull-down resistor 332 and switch 334. Example contactor controller 500 differs from its counterpart in FIG. 3 in the configuration of the LS clamp, identified by reference numeral 504 in FIG. 5. LS clamp 504 includes a switch 508, which may be in the form of an n-type MOSFET, in which its gate is coupled to an output of a voltage detection and a comparison circuit 506, which essentially replaces constant clamp current generation circuit 306 of example contactor controller 300.

Voltage detection and comparison circuit 506 has inputs for VM and $V_{OUT}$, respectively, as well as an output that is coupled to LS clamp 504, and more specifically to the gate of FET 508. FET 508 is interposed between FET 324 and the signal path between LS driver 224 and the gate of LSFET 208, in which the drain of FET 508 is coupled to the drain of FET 324 and the source of FET 508 is coupled to such signal path. In general, circuit 506 detects when $V_{OUT}$ is greater than a QTO threshold voltage, and in response, outputs an enable signal LSQTO_EN to turn on FET 508, which in turn, enables charging of the gate of LSFET 208. If the QTO voltage defined in comparison circuit 506 is less than normal operation QTO target voltage, switch 508 does not interfere with normal operation QTO.

Figure 6:
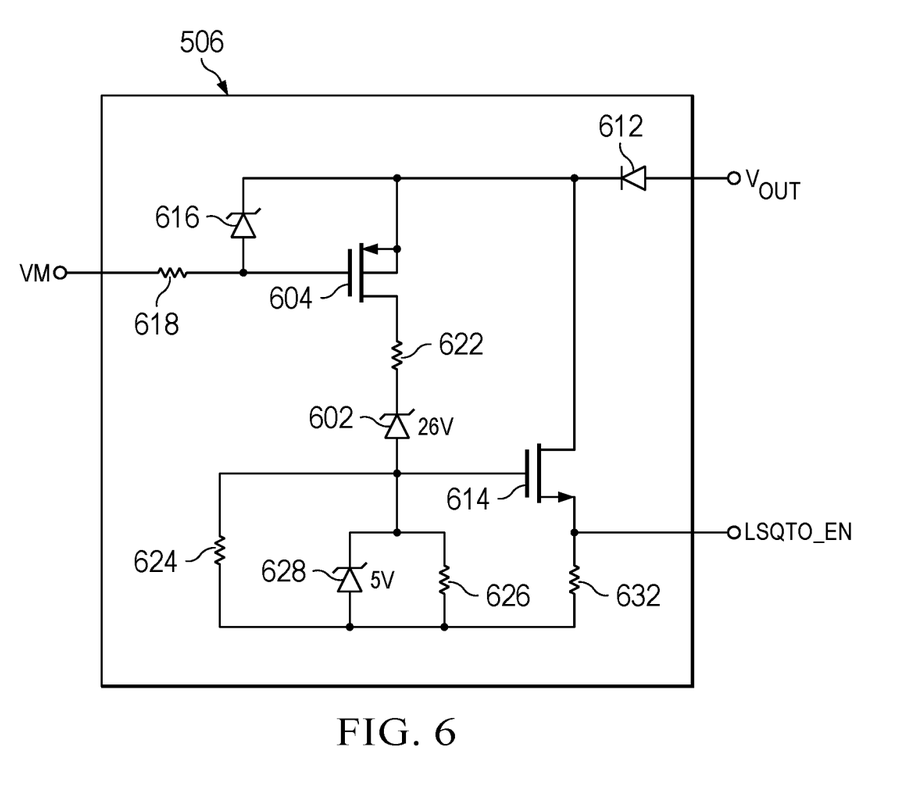
FIG. 6 is a diagram of an example voltage detection and comparison circuit, which may be employed in an example contactor system, such as that shown in FIG. 5.

FIG. 6 is circuit diagram of example voltage detection and comparison circuit 506. In general, circuit 506 detects when $V_{OUT}$ is greater than a QTO threshold voltage and VM, which is less than the QTO threshold voltage. The QTO threshold voltage is set by the breakdown voltage of Zener diode 602. In the illustrated example, the breakdown voltage of Zener diode 602 and thus the QTO threshold voltage is approximately 26 V, although it may be a different voltage in other examples. Circuit 506 is configured such that, when $V_{OUT}$ becomes greater than VM, PMOS transistor 604 turns on, and then, when $V_{OUT}$ increases further to the point that it is greater than the breakdown voltage of Zener diode 602, LSQTO_EN is output to turn on FET 508. With FET 508 on, a charge path is opened to enable the charging of the gate of LSFET 208.

In the illustrated example, voltage detection and comparison circuit 506, the $V_{OUT}$ input terminal is coupled to the anode of a diode 612, the cathode of which is coupled to the source of PMOS transistor 604, to the source of an NMOS transistor 614, and to the cathode of a Zener diode 616. The VM input terminal is coupled to one end of an input resistor 616, the other end of which is coupled to the anode of diode 616 and to the gate of PMOS transistor 604. The drain of PMOS transistor 604 is coupled to the cathode of Zener diode 602 via a resistor 622, and the anode of Zener diode 602 is coupled to the gate of NMOS transistor 614, to one end of each of two biasing resistors 624 and 626, and to the cathode of Zener diode 628, which may have a breakdown voltage of approximately 5 V. The other ends of resistors 624 and 626 and the anode of Zener diode 628 may be commonly coupled to a node that represents ground. The output of voltage detection and comparison circuit 506 (i.e., where LSQTO_EN is output) is taken from the source of NMOS transistor 614, and its source is coupled to the common ground node via resistor 632. These components of example voltage detection and comparison circuit 506 may be suitably sized and configured to achieve the desired function of circuit 506, which is not limited to the specific configuration shown. Other circuit component configurations may also be employed consistent with the teachings herein.

Figure 7:
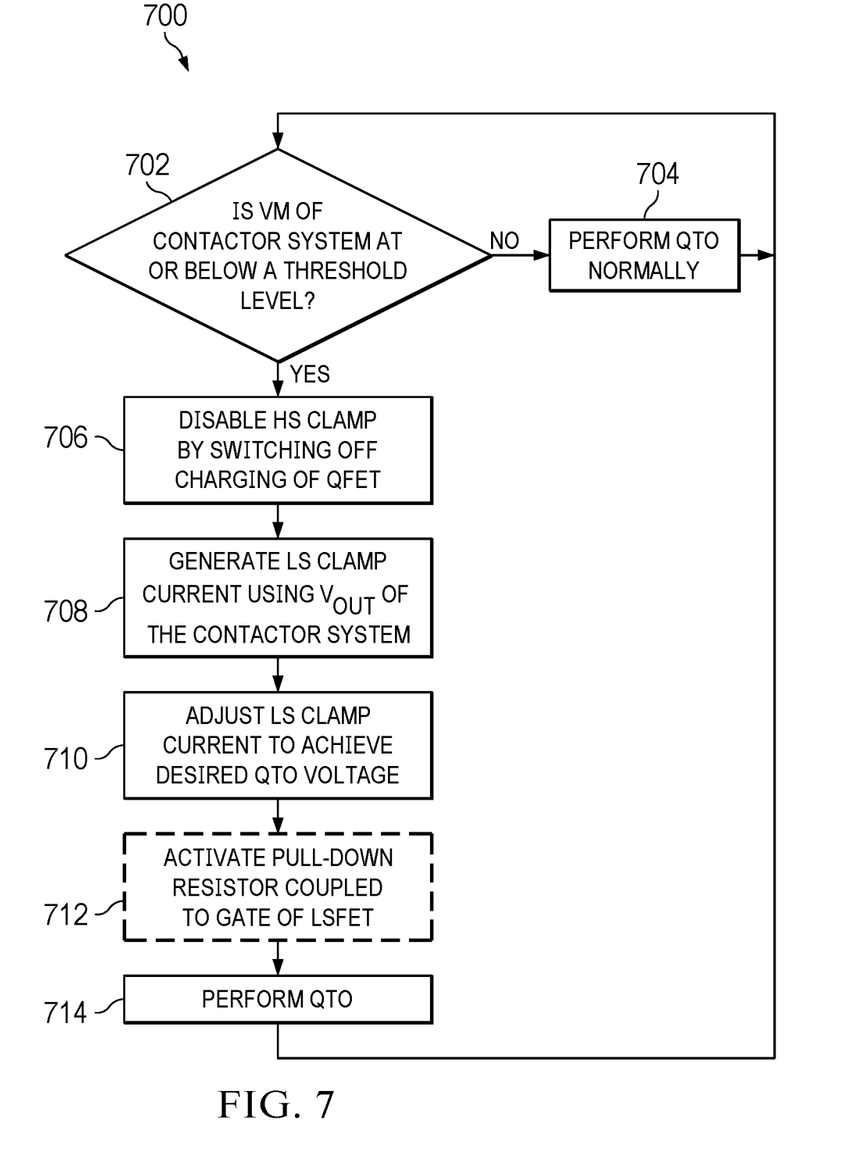
FIG. 7 is a flow diagram of an example method of operating a contactor controller, such as that shown in FIG. 3, when QTO is needed.

FIG. 7 is a flow diagram of an example method 700 of operating a contactor controller or electromechanical switching device controller, e.g., contactor controller 300, when QTO is needed. In example method 700, a determination is made in operation 702 as to whether VM (the supply voltage) of contactor controller 300 is at or below a threshold level, which may be indicative of a power-off situation. The threshold level may therefore be set at a very low voltage or zero. If VM has not fallen below that threshold level (No), operation of contactor controller 300 performs QTO normally in operation 704. Monitoring of VM relative to the threshold level then continues when QTO is needed again; thus, flow returns to operation 702.

When VM does reach or fall below the threshold voltage (Yes in operation 702), contactor controller 300 is configured for power-off QTO. In operation 706, HS clamp 302 is disabled using voltage selector 314, which outputs a control signal (SH_GATE) to switch off the charging of QFET 210 in response to $V_{OUT}$. $V_{OUT}$ is also used in operation 708 to cause clamp current source 322 to generate the LS clamp current ($I_{LSCLAMP}$). The LS clamp current may then be adjusted to achieve a desired QTO voltage in operation 710. If desired or needed, in operation 712, pull-down resistor 332 may be activated, e.g., coupled to the gate of LSFET 208 via switch 334, to further reduce the likelihood of LSFET 208 turning on in the process. With contactor controller 300 so configured, QTO is performed in operation 714. After performing the power-off QTO, VM continues to be monitored for the next QTO, thus returning to operation 702.

Figure 8:
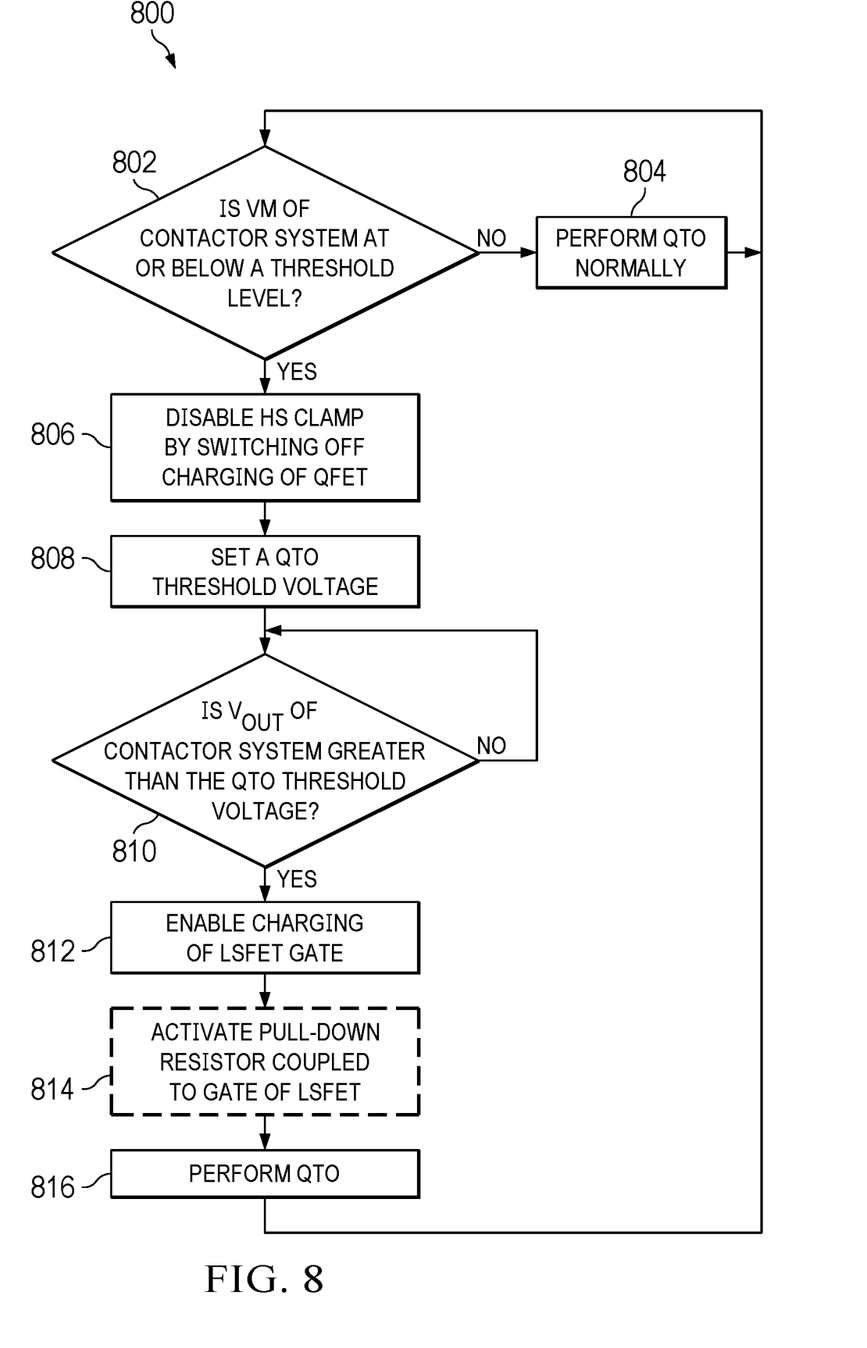
FIG. 8 is a flow diagram of an example method of operating a contactor controller, such as that shown in FIG. 5, when QTO is needed.

FIG. 8 is a flow diagram of an example method 800 of operating a contactor controller or electromechanical switching device controller, e.g., contactor controller 500, when QTO is needed. In example method 800, as in example method 700, VM is monitored to determine whether it is at or below a threshold level, which may be indicative of a power-off situation (operation 802). If VM has not fallen below that threshold level (No in operation 802), operation of contactor controller 500 performs QTO normally in operation 804. Monitoring of VM relative to the threshold level then continues when QTO is needed again; thus, flow returns to operation 802. Operation 806 is similar to operation 706, in which HS clamp 302 is disabled using voltage selector 314, which outputs a control signal (SH_GATE) to switch off charging of QFET 210 in response to $V_{OUT}$, when VM reaches or falls below the threshold level (Yes in operation 802).

In operation 808, a QTO threshold voltage is set, and in operation 810, a determination is made as to whether $V_{OUT}$, which is monitored, is greater than the QTO threshold voltage. If not, monitoring of $V_{OUT}$ continues. Once $V_{OUT}$ exceeds the QTO threshold voltage, which may be detected by voltage detection and comparison circuit 506, the charging of the gate of LSFET 208 is enabled in operation 812. That is, once circuit 506 detects that $V_{OUT}$ is greater than the QTO threshold voltage, circuit 506 outputs an enable signal LSQTO_EN to turn on FET 508, which in turn, enables charging of the gate of LSFET 208.

If desired or needed, in operation 814, pull-down resistor 332 may be activated, e.g., coupled to the gate of LSFET 208 via switch 334, to further reduce the likelihood of LSFET 208 turning on in the process. With contactor controller 500 so configured, QTO is performed in operation 816. After performing the power-off QTO, VM continues to be monitored for the next QTO, thus returning to operation 802.

Each of FIGS. 7 and 8 depicts one possible set and order of operations. Not all operations need necessarily be performed in the order described. Some operations may be combined into a single operation. One or more operations may be performed simultaneously or partially overlapping. Additional operations and/or alternative operations may be performed.

The example systems, circuits and methods improve QTO in electromechanical switching device controllers, e.g., high-voltage contactor controllers. Circuitry is provided to enable QTO when the supply voltage of the contactor controller is insufficient, i.e., when the power is low or off, without limiting power-on QTO. Low power QTO uses the coil or load energy to activate reverse biasing and provides a minimum QTO clamp voltage. No area-intensive passive diodes are needed to route the coil current during low power QTO.

The term "couple" is used throughout the specification. The term and derivatives thereof may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (i.e. programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal" and "node" generally mean an interconnection between or a terminus of a device element, a circuit element, an integrated circuit, a device or other electronic or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, etc.), and/or one or more sources (such as voltage and/or current sources) may instead include only the semiconductor elements within a single physical device (i.e. a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of FETs is described herein, other types of transistors (or equivalent devices) may be used instead. For example, instead of using FETs, bipolar junction transistors (BJTs) may be used instead of, or in addition to, FETs in the various circuits described. Other suitable switching devices consistent with the teachings herein may also be used. Circuits described herein are reconfigurable to include the replaced components to provide functionality at least partially similar to functionality available prior to the component replacement.

Uses of the phrase "ground" in the foregoing description refers primarily to a power ground, but includes a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value.

Modifications of the described examples are possible, as are other examples, within the scope of the claims. Moreover, features described herein may be applied in other environments and applications consistent with the teachings provided.

What is claimed is:

1. A method, comprising:
    detecting that a supply voltage of a contactor system is less than a threshold voltage in response to a determination that quick-turn-off (QTO) is to be performed;
    disabling a high-side (HS) clamp of the contactor system;
    generating a current for a low-side (LS) clamp of the contactor system using an output voltage of the contactor system; and
    performing QTO.

2. The method of claim 1, further comprising:
    activating a pull-down resistor coupled to the control terminal of a LS transistor of the contactor system.

3. The method of claim 1, wherein the disabling of the HS clamp includes outputting a charge disable signal to disable charging of a middle transistor of the contactor system, the middle transistor coupled between a HS transistor and a LS transistor.

4. The method of claim 1, wherein the generating of the current for the LS clamp includes applying a signal to a current source of the LS clamp.

5. The method of claim 4, wherein the generating of the current for the LS clamp includes applying the signal to the current source of the LS clamp when the output voltage is greater than a minimum QTO voltage.

6. The method of claim 5, further comprising:
    adjusting the current source of the LS clamp to obtain a desired QTO voltage.

7. A method, comprising:
   detecting that a supply voltage of a contactor system is less than a threshold voltage in response to a determination that quick-turn-off (QTO) is to be performed;
   disabling a high-side (HS) clamp of the contactor system;
   setting a QTO threshold voltage;
   determining that an output voltage of the contactor system is greater than the QTO threshold voltage;
   enabling charging of a low-side (LS) transistor of the contactor system; and
   performing QTO.

8. The method of claim 7, further comprising:
   activating a pull-down resistor coupled to the control terminal of the LS transistor.

9. The method of claim 7, wherein the disabling of the HS clamp includes outputting a charge disable signal to disable charging of a middle transistor of the contactor system, the middle transistor coupled between a HS transistor and a LS transistor.

10. The method of claim 7, wherein the enabling of charging of the LS transistor include s outputting a charge enable signal in response to determining that the output voltage is greater than the QTO threshold voltage.

11. A system, comprising:
   a high-side (HS) transistor having first and second current terminals and a gate;
   a low-side (LS) transistor having first and second current terminals and a gate;
   a middle transistor having first and second current terminals and a gate, the second current terminal of the middle transistor coupled to the second current terminal of the HS transistor, and the first current terminal of the middle transistor coupled to the first current terminal of the LS transistor, the coupling of the first current terminals of the middle and LS transistors providing an output node of the system;
   a HS clamp coupled between the gate of the middle transistor and the output node, the HS clamp including a disable circuit having a supply voltage input, an output voltage input, and an output coupled to a switch-controlled current path between the first terminal of the middle transistor and the gate of the middle transistor;
   a LS clamp coupled between the gate of the LS transistor and the output node; and
   a control circuit having a supply voltage input, an output voltage input, and an output coupled to the LS clamp.

12. The system of claim 11, further comprising:
   a pull-down resistor selectively couplable to the gate of the LS transistor.

13. The system of claim 11, wherein the HS clamp includes a switch transistor having a gate coupled to the output of the disable circuit.

14. The system of claim 11, wherein the control circuit comprises a LS clamp generation circuit, the LS clamp generation circuit including the supply voltage input, the output voltage input, and the output of the control circuit.

15. The system of claim 14, wherein the LS clamp includes an adjustable current source having an input coupled to the output of the LS clamp current generation circuit.

16. The system of claim 11, wherein the LS clamp includes a switch-controlled current path between the first current terminal of the LS transistor and the gate of the LS transistor.

17. The system of claim 11, wherein the control circuit comprises a voltage detection and comparison circuit, the voltage detection and comparison circuit including the supply voltage input, the output voltage input, and the output of the control circuit.

18. The system of claim 15, wherein the LS clamp includes a switch having an input coupled to the output of the voltage detection and comparison circuit.

19. The system of claim 18, wherein the voltage detection and comparison circuit is configured to output a charge enable signal to the switch when an output voltage is greater than a QTO threshold voltage to enable charging of the gate of the LS transistor.

20. The system of claim 17, wherein the QTO threshold voltage is set below a powered-on QTO target voltage.

* * * * *